US006996943B2

(12) United States Patent
Denier et al.

(10) Patent No.: US 6,996,943 B2
(45) Date of Patent: Feb. 14, 2006

(54) CABLE SUPPORT BRACKET

(75) Inventors: Dennis J. Denier, Cincinnati, OH (US); Charles H. Bull, Fairfield, OH (US); Joseph P. Kallmeyer, Cincinnati, OH (US)

(73) Assignee: Denier Electric Co., Inc., Ross, OH (US)

( * ) Notice: Subject to any disclaimer, the term of this patent is extended or adjusted under 35 U.S.C. 154(b) by 291 days.

(21) Appl. No.: 10/108,307

(22) Filed: Mar. 28, 2002

(65) Prior Publication Data

US 2003/0182881 A1 Oct. 2, 2003

(51) Int. Cl.
*H02G 3/24* (2006.01)

(52) U.S. Cl. .................... 52/220.7; 52/242; 52/715; 52/98; 174/50; 174/63; 174/64; 248/906; 248/205.1; 220/3.2

(58) Field of Classification Search ............... 52/220.7, 52/242, 715, 712, 98, 745.09; 248/906, 205.1, 248/27.1, 909, 248; 174/50, 53, 54, 58, 60, 174/63, 64; 220/3.2; 211/89.11; 403/315, 403/316, 317, 318, 319, 282, 280; 285/24, 285/27, 61, 64
See application file for complete search history.

(56) References Cited

U.S. PATENT DOCUMENTS

| | | | | |
|---|---|---|---|---|
| 1,288,024 A | * | 12/1918 | Kendig ........................ 220/3.9 |
| 1,531,423 A | | 3/1925 | Simpson |
| 1,675,921 A | | 7/1928 | Buchanan |
| 2,032,636 A | | 3/1936 | Seckinger |
| 2,042,620 A | | 6/1936 | Noyes |
| 2,324,791 A | * | 7/1943 | McLoughlin et al. ........ 220/3.8 |
| 2,480,805 A | | 8/1949 | Buckels |
| 2,990,172 A | * | 6/1961 | Gianotta ........................ 269/50 |
| 2,997,265 A | * | 8/1961 | Weiss ........................ 248/68.1 |
| 4,569,458 A | | 2/1986 | Horsley |
| 4,572,391 A | | 2/1986 | Medlin |
| 4,603,789 A | | 8/1986 | Medlin, Sr. |
| 4,645,089 A | | 2/1987 | Horsley |
| 4,753,361 A | | 6/1988 | Medlin, Jr. |
| 4,790,505 A | | 12/1988 | Rose et al. |
| 4,832,297 A | * | 5/1989 | Carpenter ................ 248/205.1 |
| 4,840,334 A | * | 6/1989 | Kikuchi ........................ 248/73 |
| 4,964,525 A | | 10/1990 | Coffey et al. |
| 5,067,677 A | * | 11/1991 | Miceli ........................ 248/68.1 |
| 5,098,046 A | * | 3/1992 | Webb ........................ 248/27.1 |
| 5,141,185 A | | 8/1992 | Rumbold et al. |
| 5,221,814 A | | 6/1993 | Colbaugh et al. |
| 5,224,673 A | * | 7/1993 | Webb ........................ 248/27.1 |
| 5,288,041 A | | 2/1994 | Webb |
| 5,378,174 A | * | 1/1995 | Brownlie et al. ........... 439/709 |
| 5,405,111 A | * | 4/1995 | Medlin, Jr. .............. 248/205.1 |
| 5,423,499 A | | 6/1995 | Webb |
| 5,448,011 A | | 9/1995 | Laughlin |
| 5,452,873 A | | 9/1995 | Laughlin |
| 5,527,990 A | * | 6/1996 | Comerci et al. ............... 174/48 |
| 5,595,362 A | | 1/1997 | Rinderer et al. |
| 5,646,371 A | | 7/1997 | Fabian |
| 5,810,303 A | | 9/1998 | Bourassa et al. |
| 5,913,787 A | * | 6/1999 | Edwards .................... 52/220.7 |
| 6,098,939 A | * | 8/2000 | He ........................... 248/205.1 |
| 6,147,304 A | * | 11/2000 | Doherty ........................ 174/48 |
| 6,147,306 A | * | 11/2000 | Wilkins ........................ 174/58 |
| 6,188,022 B1 | | 2/2001 | He |
| 6,375,017 B1 | * | 4/2002 | Schattner et al. ........ 211/85.13 |
| 6,384,334 B1 | * | 5/2002 | Webb ........................... 174/58 |
| 6,573,449 B1 | * | 6/2003 | Vrame ........................... 174/58 |
| 6,590,155 B1 | * | 7/2003 | Vrame et al. .................. 174/50 |
| 6,723,918 B1 | * | 4/2004 | Vrame .......................... 174/50 |

* cited by examiner

*Primary Examiner*—Kimberly Wood
(74) *Attorney, Agent, or Firm*—Wood, Herron & Evans, L.L.P.

(57) ABSTRACT

A bracket for supporting an electrical junction box within a wall frame. The bracket has a junction box support portion adapted to be connectable to the electrical junction box and a cable support portion extending from the junction box support portion. The cable support portion has a cable securing portion that receives and automatically secures the electrical cables in the cable support portion, thereby fixing the electrical cables a desired distance from the junction box.

26 Claims, 5 Drawing Sheets

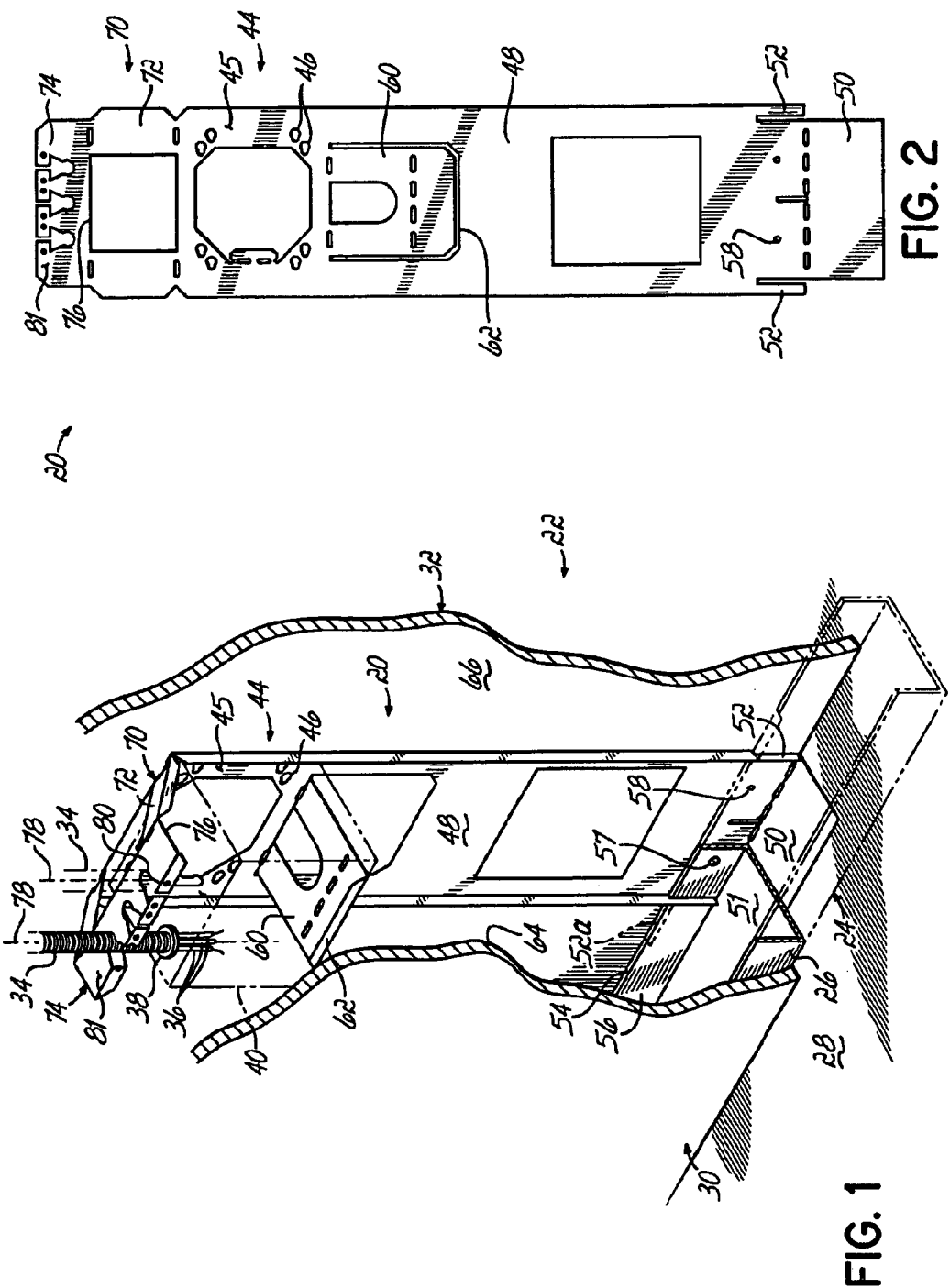

CABLE SUPPORT BRACKET

FIELD OF THE INVENTION

This invention relates generally to wiring accessories and more particularly, to wiring accessories for routing and securing wires in the interior of a studded wall.

BACKGROUND OF THE INVENTION

Known building construction utilizes a wall frame structure comprised of vertical studs interconnected with horizontal head and toe plates. Wall material like gypsum wall board is fastened to both sides of the studs and plates to provide a finished wall surface. Electric utilities, for example, power wires, communications cables and other kinds of wiring are often located in flexible, metal clad or armored cable; and the metal cable containing the wires is routed within the wall frame structure prior to the gypsum wall board being installed. In recent years, an increasing number of structures employ a metal wall frame structure rather than the traditional wooden studs and plates. A typical metal stud is an elongated U-shaped sheet metal member having a cross-sectional area approximately equal to a cross-sectional area of a standard wooden stud. When metal framing is used, the toe plate is often referred to as the bottom track. Wherever an electrical outlet is required, an electrical junction box is secured at a desired location to the wall frame structure, for example, a vertical stud or the horizontal bottom track. A junction box may have a mounting flange for directly mounting the junction box to a stud, or the junction box may be mounted to a bracket that, in turn, is mounted to the wall frame structure. Further, brackets of different designs are known for securing a junction box to a metal stud or bottom track. The sheet metal brackets provide great flexibility in locating the junction box within the wall frame structure.

It is often desired or even required that the cables terminating in a junction box be fixed or secured to a stud or other support within a fixed distance of the junction box. Thus, after a junction box is installed within a wall structure, cables going to and from the junction box are secured to a stud or plate with a separate clip. While any one clip does not take long to install, the cumulative time required to install a clip for all of the cables running to and from all of the junction boxes in a wiring installation can be significant. Thus, the installation of such clips substantially increases the labor cost associated with the installation of the electric utilities in a building.

Therefore, there is a need for a wiring accessory that eliminates the need to separately install clips for securing cables that terminate in a junction box.

SUMMARY OF THE INVENTION

The present invention provides a bracket for mounting an electrical junction box that substantially reduces the costs of installing electric utilities in a building. The electrical junction box mounting bracket of the present invention allows cables terminating in the junction box to be easily and quickly fixed or secured to the bracket a desired distance from the junction box. The electrical junction box mounting bracket of the present invention eliminates the need to separately install cable securing clips to the wall frame structure, thereby substantially reducing the labor and associated costs required to install electric utilities in a building.

According to the principles of the present invention and in accordance with the described embodiments, the invention provides a bracket for supporting an electrical junction box within a wall frame. The bracket has a junction box support portion adapted to be connectable to the electrical junction box and a cable support portion extending from the junction box support portion. The cable support portion has a cable securing portion that receives and automatically secures the electrical cables in the cable support portion, thereby fixing the electrical cables a desired distance from the junction box without the use of separate cable clips.

In one aspect of the invention, the cable support portion has a plurality of openings that receive the electrical cables and a plurality of deformable tabs. The deformable tabs secure an electrical cable in a different one of the plurality of holes. In a further aspect of the invention, the bracket can be configured to attach to a bottom track or a stud in the wall frame.

In another embodiment of the invention, a bracket without an electrical junction box mounting surface is provided for supporting electrical cables within a wall frame. The bracket has an attachment portion that is connectable to the wall frame, a plurality of openings and associated deformable tabs. Each of the openings receives an electrical cable, and each of the deformable tabs automatically securing the electrical cable in the opening.

These and other objects and advantages of the present invention will become more readily apparent during the following detailed description taken in conjunction with the drawings herein.

BRIEF DESCRIPTION OF THE DRAWINGS

FIG. 1 is a perspective view of one embodiment of a mounting bracket that attaches to a bottom track of a wall frame and supports an electrical junction box and associated cables in the wall frame structure in accordance with the principles of the present invention.

FIG. 2 is a sheet metal layout of the mounting bracket of FIG. 1.

DETAILED DESCRIPTION OF THE INVENTION

Figure 3:
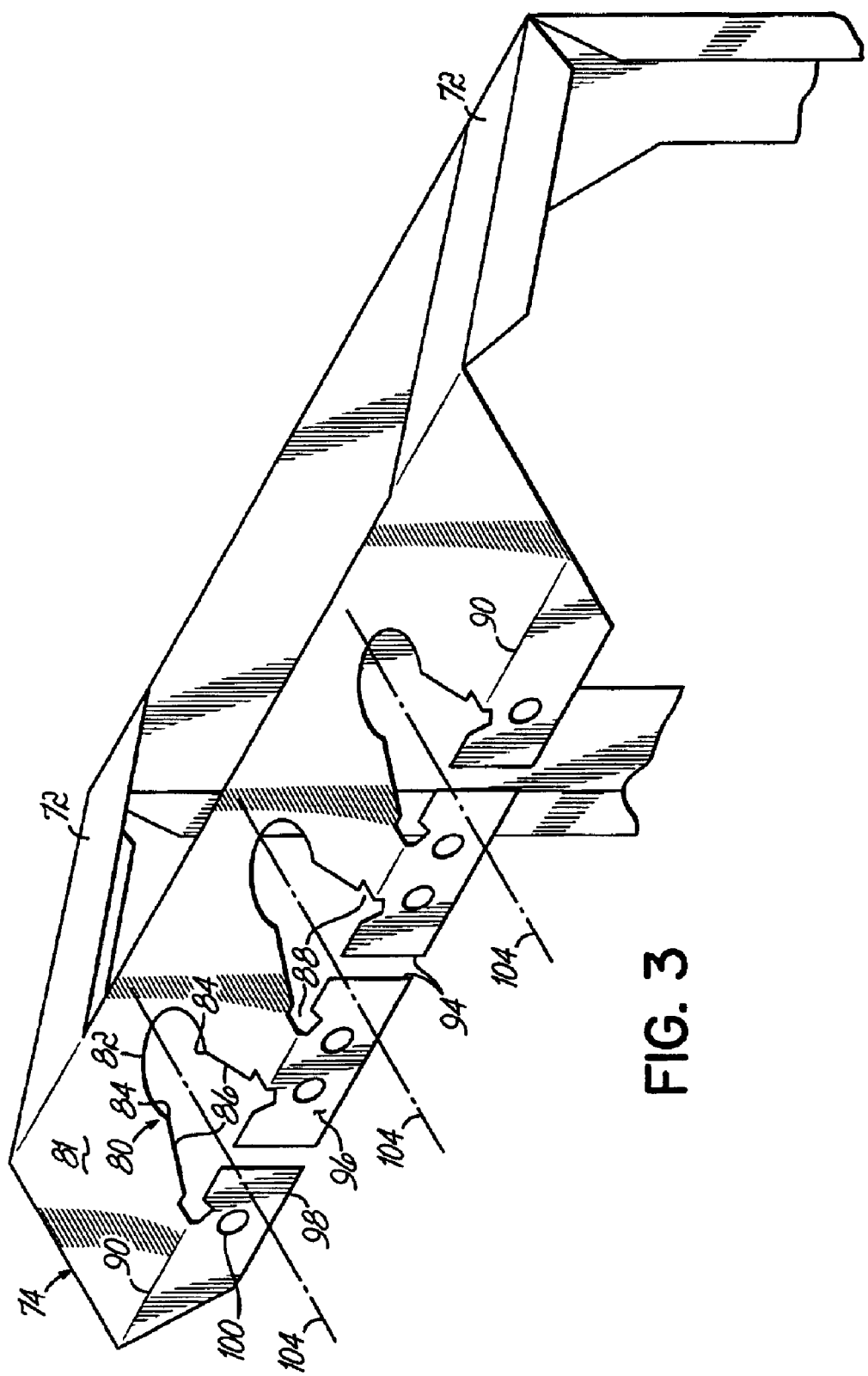
FIG. 3 is a perspective view of a cable support used with the mounting bracket of FIG. 1 prior to an installation of a cable.

Referring to FIG. 1, an electrical junction box mounting bracket 20 is shown mounted within a wall 22. The wall 22 is made of a known wall frame structure 24 including a generally horizontal bottom track 26 that is rigidly connected to a floor surface 28. The wall frame structure 23 further includes generally vertical studs (not shown), the ends of which are rigidly connected to a generally horizontal top track (not shown) and the bottom track 26. The studs and plates are often made from an elongated generally U-shaped sheet metal channel piece. Gypsum wall board panels 30, 32 are rigidly connected to the bottom track 26 and other portions of the wall frame structure 24 in a known manner via fasteners, for example, sheet metal screws (not shown).

The bracket 20 is positioned at a desired longitudinal location with respect to the bottom track 26. Such a junction box 40 is located at a desired position with respect to the wall 22. The bracket 20 has a junction box mounting portion 44 with a planar junction box mounting surface 45. The junction box 40 is mounted to the mounting surface 45 via fasteners, for example, sheet metal screws (not shown) extending through holes 46 in the bracket 20. Electric utilities, for example, electric power, is routed inside the wall 22 by one or more metal clad or armored cables 34 that carry electric power wires 36 therein. Each of the armored cables 34 terminates with a connector 38 that is rigidly attached to an opening in an electrical junction box 40 in a known manner. The junction box support portion 44 is located at an upper end of a vertical post or column member 48, and the vertical member 48 has a lower end connected to, and contiguous with, an attachment portion or foot 50.

Prior to mounting the bracket 20 to the bottom track 26, the tabs 52 are bent outward as shown in phantom at 52a. Next, the bottom track 26 is located at a desired position; and the foot 50 is kicked or pushed between the web portion 51 of the bottom track 26 and the floor 28. When the bracket 20 is located against an outer surface of the bottom track sidewall 56, the tabs 52 are then bent back to their original position as shown in solid lines. Thus, bracket 20 is secured to the bottom track 26, by capturing the bottom track sidewall between the tabs 52 and the vertical plate 48. One may also use fasteners, for example, sheet metal screws 57, extending through the holes 58. As will be appreciated, the bracket 20 can be connected with the bottom track 26 by fasteners extending through any other overlapping portions, for example, the foot 50 of the bracket 20 and the web 51 of the bottom track 26.

The bracket 20 further has a spacer or leg 60 with a lip 62 on its distal end. When the gypsum wall board panels 30, 32 are attached to the wall frame structure 23, the lip 62 contacts a rear surface 64 of the wall 30 and locates the junction box mounting portion 44 against the inner surface 66 of the opposite wall 32. Thus, the location of the electrical junction box 40 is stabilized between the walls 30, 32.

A cable support 70 is contiguous with and extends outward from the junction box support portion 44 of the vertical plate 48. The cable support 70 is comprised of an extender member 72 that extends upward and outward from the upper end of the vertical plate 48. The extender member 72 is oriented at an angle of about 45° with respect to the junction box support surface 45. A cable securing portion 74 extends from a distal end 76 of the extender 72 in such a manner that the cables 34 are properly directed into the box 40. For proper orientation, the centerlines 78 of the cables 34 define a plane that is substantially parallel to, but offset from, the junction box mounting surface 45. Thus, the cable securing portion 74 has a first surface 81 defining a plane that is substantially perpendicular to the junction box mounting surface 45. However, being sheet metal, the extender member 72 and cable securing portion 74 can be manually bent or adjusted to locate cable securing portion 74 at any desired position and orientation.

Referring to FIG. 3, the cable securing portion 74 of the cable support 70 includes a plurality of holes or cutouts 80 lying in the first surface 81. The cutouts 80 have a general keyhole shape and have a first generally circular portion 82. The circular portion 82 terminates at a mouth 84 that defines a chord across the circular portion 82 having a length slightly less than a maximum diameter of an electric cable to be secured in the circular portion 82. The cutout 80 flares outward with two diverging linear sides 86 that terminate into respective identical relief portions 88. The cutout 80 terminates at an edge 90 of the planar surface 81. The cable securing portion 74 further includes pairs of tabs 94 associated with each cutout 80. Each of the pairs of tabs 94 have respective generally coplanar surfaces 96 that are substantially perpendicular to the surface 81. Proximal ends 98 of the respective tabs 96 have respective holes 100. The tabs 96 have a length such that their respective distal ends 102 are equally spaced from a centerline 104 bisecting the opening 80. The bracket 20 is formable in a known manner from a flat piece of sheet metal as shown in FIG. 2 that has various holes, openings, slots and spaces cut or stamped therein.

Figure 4:
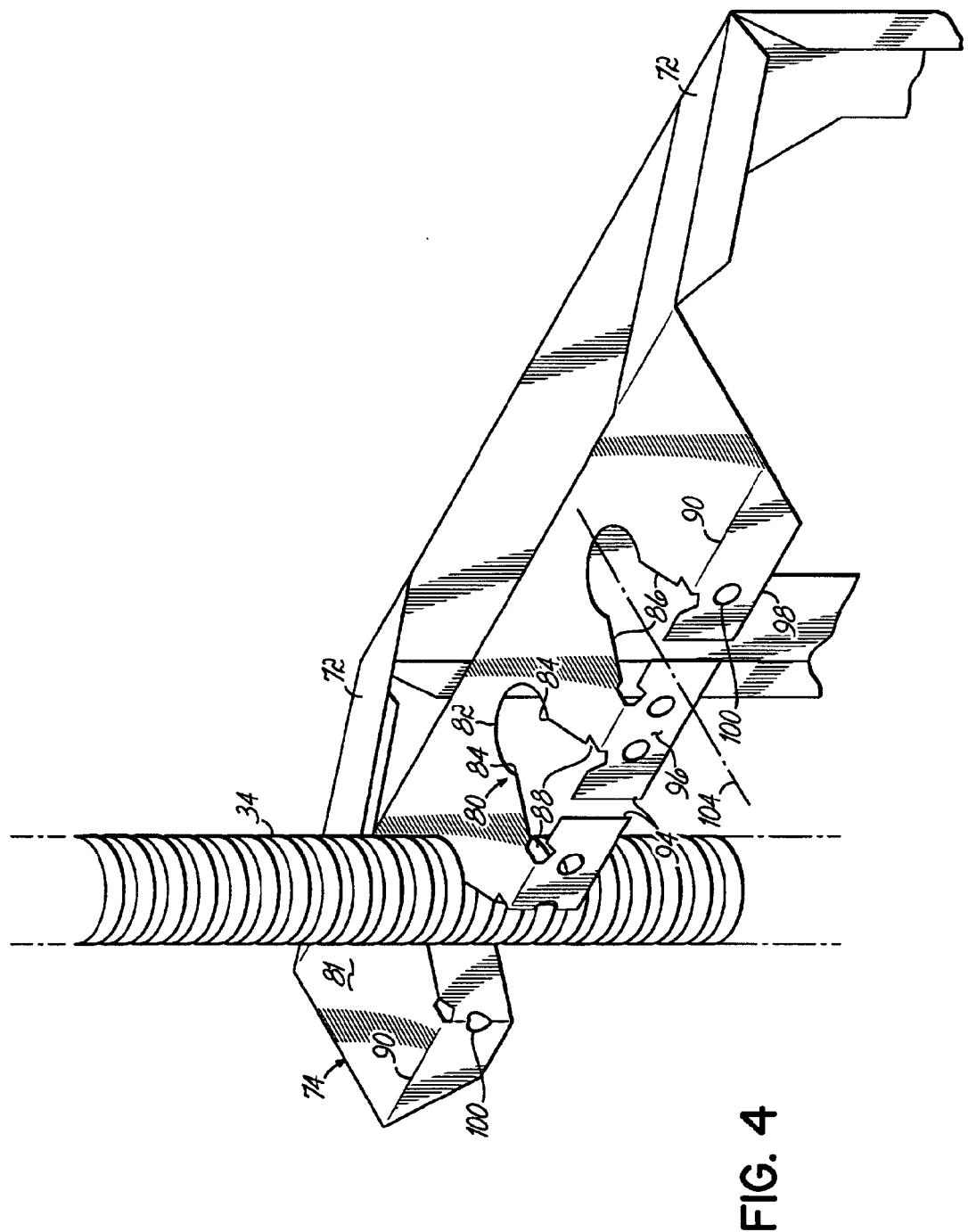
FIG. 4 is a perspective view of the cable support of FIG. 3 after the installation of a cable.

In use, a cable 34 is manually forced against the tabs 96 toward the opening 80. The application of the force causes the tabs 96 to begin to bend inwardly toward the hole 80. The linear sides 86 form a receiving space that allows the tabs 96 to fold inwardly without interference. The holes 100 provide a weakened area at the proximal ends 98 of the tabs 96, and the tabs 96 generally fold along the line extending between the reliefs 88 and respective holes 100. The continued application of the force against the cable 34 pushes the cable past the tabs 96, and the sides 86 guide the cable 34 to the mouth 84 of the circular portion 82. The mouth 84 has an opening size that is slightly smaller than a maximum diameter of the cable 34, so that the cable 34 experiences some interference with the mouth 84 as it is moved therethrough. Thus, with a continued application of the force against the cable 34, the cable snaps past the mouth 84 and into the circular opening 82 as illustrated in FIG. 4. Thus, the cable 34 is automatically held or secured in the circular portion 82 of the opening 80 by the mouth 84 and the distal ends 102 of the tabs 96. Further, referring back to FIG. 1, the cables 34 are held or secured at a location that is a desired fixed distance, for example, six inches, from the electrical junction box 40.

Figure 5:
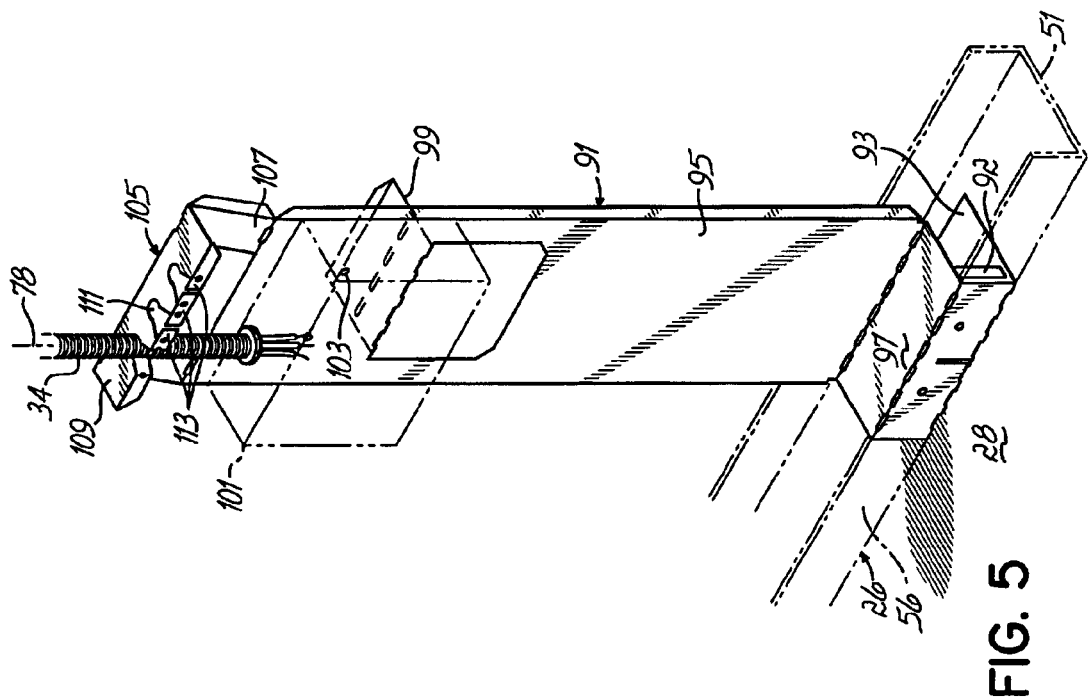
FIG. 5 is a perspective view of another embodiment of a mounting bracket that attaches to a bottom track of a wall frame and supports an electrical junction box and associated cables in the wall frame structure in accordance with the principles of the present invention.

FIG. 5 illustrates an alternative embodiment of a mounting bracket 91 that is also securable at any location on the bottom track 26. The mounting bracket 91 is installed in a similar manner as bracket 20 previously described. First, tabs 92 are bent upward and a foot 93 is kicked or pushed between the bottom track web 51 and the floor 28. The tabs 92 are then bent back down to their illustrated position to secure the mounting bracket 91 to the bottom track 26. A vertical plate 95 is offset from a bottom track sidewall 56 by spacer plate 97, and thus, the vertical plate 95 extends upward at a location between the bottom track sidewalls 56. A spacer 99 extends from the vertical plate 95 and contacts a rear side of a wall board (not shown) attachable to the bottom track sidewall 56. Thus, the spacer 99 properly locates an upper end of the mounting bracket 91 within the wall frame structure. An electrical junction box 101, shown in phantom, is mounted to the vertical plate 95 via fasteners (not shown) extending through holes 103.

A cable support 105 extends from an upper end of the vertical plate 95 and is substantially identical in construction to the cable support 70 illustrated and described with respect to FIGS. 1–4. The cable support 105 has an extender portion 107 that extends upward at an angle from the vertical plate 95. A cable securing portion 109 extends from a distal end of the extender portion 107. Being sheet metal, the extender portion 107 and cable securing portion 109 can be manually bent or adjusted to locate cable receiving openings 111 at any desired position and orientation. Normally, it is desirable that the cable receiving openings 111 lie in a generally horizontal plane. Pairs of tabs 113 function identically to the pairs of tabs 94 previously described in FIGS. 3 and 4 and help position and secure the cables 34 with respect to the junction box 101.

Figure 6:
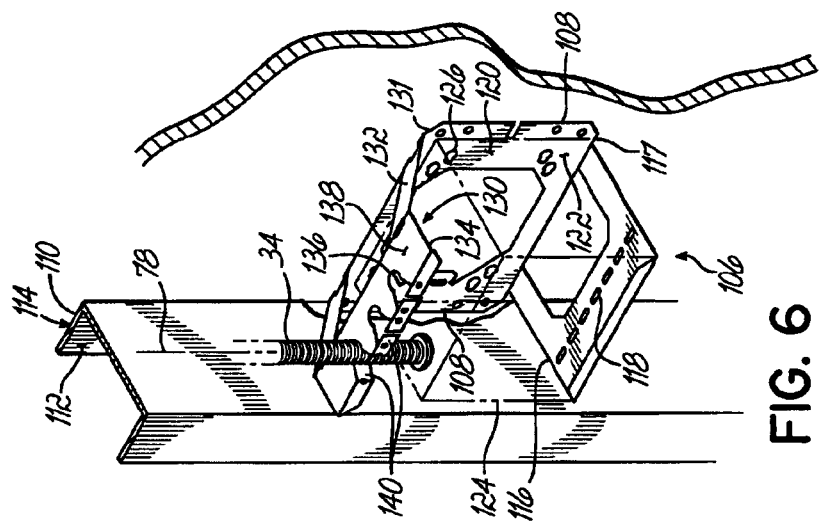
FIG. 6 is a perspective view of a stud bracket that supports an electrical junction box from a stud of a wall frame structure in accordance with the principles of the present invention.

FIG. 6 illustrates an embodiment of a stud mount bracket for supporting an electrical junction box. The bracket 106 has lateral mounting flanges 108 one of which is attached to an outer surface 110 of a sidewall 112 of a vertical stud 114 by fasteners, for example, sheet metal screws (not shown). The bracket 106 has a foot portion 116 with a series of holes 118 that permit the foot portion to be folded for use with a vertical stud of a different size. The bracket 106 has an electrical junction box mounting portion 120 with a planar mounting surface 122 to which an electrical junction box 124 is mounted in a known manner using fasteners (not shown) extending through the holes 126.

The foot 116 extends from a lower end 117 of the electrical junction box mounting portion 120, and the foot 116 is substantially perpendicular to the junction box mounting surface 122. A cable support 130 extends from an upper end 131 of the junction box mounting portion 120 and is substantially identical in construction to the cable support 70 illustrated and described with respect to FIGS. 1–3. The cable support 130 has an extender portion 132 that extends at an angle of about 45° with respect to the junction box mounting portion 120. A cable securing portion 134 extends from a distal end of the extender portion 132 at an angle of about 45°. Thus, cable receiving openings 136 lie in a surface or plane 138 that is substantially perpendicular to the junction box mounting surface 120. Pairs of tabs 140 function identically to the pairs of tabs 94 previously described in FIG. 3 and help maintain cables 34 properly positioned and secured with respect to the junction box 124. That is, the cable securing portion 134 orients the cables 34 such that their respective centerlines 78 define a plane that is substantially parallel to, but offset from, the junction box mounting portion 120.

Figure 7:
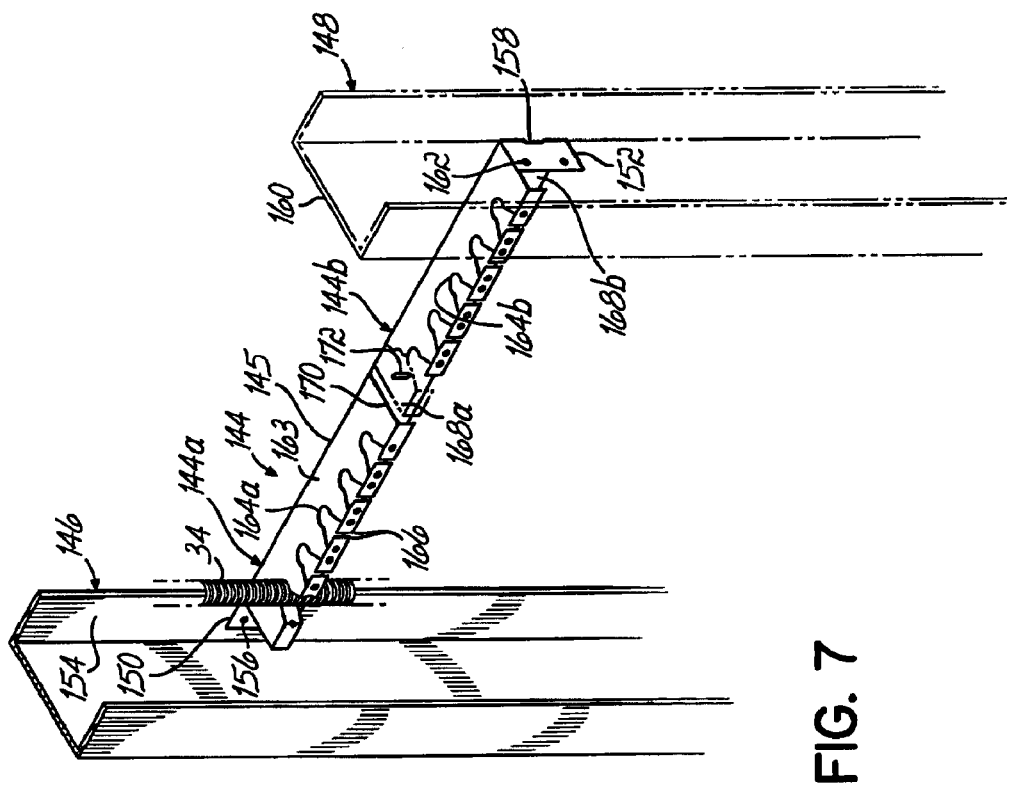
FIG. 7 is a perspective view of a bracket for supporting wires and cables in a wall frame structure in accordance with the principles of the present invention.

Referring to FIG. 7, an independent cable supporting bracket 144 is mountable between vertical studs 146, 148. The bracket 144 has a body portion 145 that extends between two attachment portions, for example, bendable mounting flanges 150, 152 at opposite ends of the body 145. The bracket 144 is supported by attaching one mounting flange 150 to an inner surface of a sidewall 154 of the stud 146 by sheet metal screws (not shown) extending through holes 156. Each of the mounting flanges 150, 152 has a relief slot 158 that permits a mounting flange, for example, mounting flange 152, to be easily bent or folded as desired. Thus, the mounting flange 152 can be bent and attached to a web portion 160 of a vertical stud 148 using sheet metal screws or other fasteners extending through holes 162.

The bracket 144 includes a cable securing portion 163 that has a plurality of cable receiving openings 164 and respective pairs of tabs 166 that are identical in construction and operation to the holes 80 and pairs of tabs 94 illustrated and described with respect to FIGS. 1–3. Thus, the bracket 144 is able to receive and support cables 34 extending between the vertical studs 146, 148.

The bracket 144 has a rear wall 168 containing an elongated slot 170 that is longitudinally aligned with a cutout 172 and centered on the rear wall 168. The elongated slot 170 and cutout 172 divide the rear wall 168 and bracket 144 into two substantially identical halves 168a, 168b and 144a, 144b, respectively. Thus, one end of the bracket 144 can be folded approximately 180° with respect to the other end, so that the rear walls 168a, 168b are adjacent each other. The bendable mounting flanges 150, 152 are also adjacent each other and can be bent so that the mounting flanges 150, 152 are in a common plane and can be attached to a common surface. The folded bracket 144a, 144b provides a first row of openings 164a that are parallel to a second row of openings 164b. The mounting flanges 150, 152 of the folded bracket 144a, 144b can be mounted on any common horizontal or vertical surface, for example, the top or bottom surface of an upper or lower plate, the lower surface of a deck or subflooring, etc. Further, the mounting flanges 150, 152 can be bent to that they overlap, and they can be attached to an end of a threaded rod that extends through aligned holes extending through both mounting flanges 150, 152. Thus, the bracket 144 provides significant versatility in mounting to surfaces regardless of their location or orientation. Alternatively, repeated folding and unfolding of the end 152 with respect to the end 150 results in the back wall 168 fracturing along the fold line extending through the elongated slot 170. Thus, the bracket 144 can be fractured or cut along the elongated slot 170 to form two shorter brackets.

The various embodiments of the brackets 20, 106, 144 each provides an apparatus for quickly and easily securing cables that are routed within a wall frame structure. Further, the electrical junction box mounting brackets 20, 106 permit cables to be easily and quickly secured a fixed distance, for example, six inches, from the junction box. The brackets 20, 106, 144 eliminate the need to manually install clips that separately secure the cables to studs or plates within the wall frame structure. Therefore, use of the brackets 20, 106, 144 substantially reduces the labor and associated costs required to install electric utilities in a building.

While the invention has been illustrated by the description of one embodiment and while the embodiment has been described in considerable detail, there is no intention to restrict nor in any way limit the scope of the appended claims to such detail. Additional advantages and modifications will readily appear to those who are skilled in the art. For example, in the described embodiment, the brackets 20, 106, 144 are described as being formed from a single piece of sheet metal. As will be appreciated, in an alternative embodiment, the brackets can be fabricated from multiple parts that fastened, bonded or welded together. Further, brackets 20, 106, 144 are described as being used principally with metal clad or armored cable. As will be appreciated, in an alternative embodiment, the brackets 20, 106, 144 can be made from sheet metal and coated with a plastic or other material that dulls the edges of the sheet metal. With that embodiment, the plastic coated sheet metal brackets can be used to secure "ROMEX" cable, other plastic wrapped wire or a plastic wrapped communication cable. In a further embodiment, the brackets 20, 106, 144 can be made from plastic or a similar material and used to secure "ROMEX" cable, other plastic wrapped wire or a plastic wrapped communication cable. In addition, the brackets 20, 106, 144 have respective cable securing portions 74, 134, 163 that include respective pairs of tabs 94, 140, 166. As will appreciated, in an alternative embodiment, any of the pairs of tabs 94, 140, 166 can be replaced by a single deformable tab.

In the described embodiments of the junction box mounting brackets 20, 106, respective extender portions 72, 132 are oriented at an angle of about 45° with respect to respective mounting portions 44, 120. Further, cable receiving holes 80, 136 are in respective planes or surfaces 81, 138 that are oriented at an angle of about 45° with respect to the respective extender portions 762, 132. Those two 45° angles and other dimensional parameters determine the fixed distance that separates the cable receiving holes 80, 136 from the respective junction boxes 40, 124. As will be appreciated, the distance that separates the cable receiving holes 80, 136 from the respective junction boxes can be varied by changing the length of the extender portions 72, 132 and the orientation angles of the extender portions 72, 132 and the respective surfaces 81, 138.

In the described embodiment, the cable securing brackets 20, 106, 144 are described for use with armored cable. As will be appreciated, the brackets 20, 106, 144 can be used with other types of cable, for example, BX cable, MC cable, "ROMEX" cable, communications cables as well as conduit and pipes. Further, in the described embodiment, the brackets 20, 106, 144 are shown attached to studs and bottom tracks of a wall frame. As will appreciated, in other embodiments, the brackets 20, 106, 144 can be attached to other structural supports, for example, cement blocks, ceiling beams, ceiling grids, an A-frame bracket, etc., as well as to the exterior or the interior of an electrical panel.

Therefore, the invention in its broadest aspects is not limited to the specific details shown and described. Consequently, departures may be made from the details described herein without departing from the spirit and scope of the claims which follow.

What is claimed is:

1. A bracket for supporting an electrical junction box within a wall frame, the junction box receiving ends of electrical cables, the bracket comprising:
   a junction box support comprising
      an upper end, and
      a mounting surface disposed below the upper end of the junction box support and comprising at least one hole adapted to receive a fastener connectable to the electrical junction box; and
   a cable support comprising
      an upper end,
      a lower end connected to the upper end of the junction box support, the cable support extending the junction box support and the junction box, and
      a cable securing apparatus located at the upper end of the cable support, the cable securing apparatus adapted to receive and secure the electrical cables in the cable support simultaneously with the ends of respective electrical cables being disposed in the electrical junction box.

2. The bracket of claim 1 wherein the junction box support and the cable support are integrally formed from a single piece of material.

3. A bracket for supporting an electrical junction box within a wall frame, the junction box receiving ends of electrical cables, the bracket comprising:
   a junction box support comprising a mounting surface comprising at least one hole adapted to receive a fastener connectable to the electrical junction box;
   an attachment member connected to the junction box support, the attachment member adapted to be connectable to the wall frame; and
   a cable support connected to the junction box support and extending from the junction box support, the cable support comprising
      a plurality of openings, each of the plurality of openings adapted to receive a different one of the electrical cables simultaneously with the ends of respective electrical cables being disposed in the electrical junction box, and
      a plurality of deformable tabs, each deformable tab automatically securing an electrical cable in a different one of the plurality of openings.

4. The bracket of claim 3 wherein the junction box support, the attachment member and the cable support are integrally formed from a single piece of material.

5. The bracket of claim 3 wherein each of the plurality of openings further comprises:
   a hole; and
   two opposed sides intersecting the hole and diverging outward from the hole to form a receiving space, the receiving space permitting the deformable tabs to deform toward the hole.

6. The bracket of claim 5 wherein an intersection of the hole and the two opposed sides defines a chord across the hole having a length smaller than a maximum diameter of the electric cable.

7. The bracket of claim 6 wherein each of the two opposed sides is linear.

8. The bracket of claim 5 wherein the hole has a substantially circular portion.

9. The bracket of claim 3 wherein the plurality of deformable tabs further comprises a pair of opposed deformable tabs for each of the plurality of openings.

10. The bracket of claim 9 wherein the plurality of openings are located in a plane and the plurality of deformable tabs are substantially perpendicular to the plane of the openings.

11. The bracket of claim 10 wherein the plurality of deformable tabs are deformable in a direction substantially parallel to the plane of the openings.

12. The bracket of claim 11 wherein the junction box support comprises a planar mounting surface and the plane of the openings is substantially perpendicular to the mounting surface.

13. The bracket of claim 12 wherein the cable support extends at an angle with respect to the junction box support.

14. The bracket of claim 13 wherein the cable support further comprises:
   an extender extending from the junction box support at an angle of about 45°; and
   the cable support extends from the extender at an angle of about 45°.

15. The bracket of claim 14 wherein the plurality of openings receive respective electric cables such that centerlines of the cables define a plane that is substantially parallel to, but offset from, the mounting surface.

16. The bracket of claim 3 wherein the attachment member is substantially perpendicular to the junction box support.

17. The bracket of claim 3 wherein the junction box support, the attachment member and the cable support are made from a single piece of sheet metal.

18. The bracket of claim 3 wherein opposed walls are attached to opposite sides of the wall frame and the bracket further comprises a spacer extending from the junction box support, the spacer adapted to contact one wall and locate the junction box support with respect to an opposite wall.

19. A bracket for supporting an electrical junction box from a bottom track of a wall frame, the junction box receiving ends of electrical cables, the bracket comprising:
   a plate having opposed ends;
   a junction box support formed at one end of the plate and having a mounting surface adapted to receive the electrical junction box;

a foot extending from an opposite end of the plate, the foot adapted to be connectable to the bottom track of the wall frame; and a cable support extending from the junction box support, the cable support comprising
an extender extending from the one end of the plate, and
the cable securing apparatus extending from the extender, the cable securing apparatus adapted to receive and automatically secure the electrical cables in the cable securing apparatus simultaneously with the ends of respective electrical cables being disposed in the electrical junction box.

20. The bracket of claim 19 wherein the plate, the junction box support, the foot and the cable support are integrally formed from a single piece of material.

21. The bracket of claim 19 wherein the cable securing apparatus comprises:
a plurality of openings adapted to receive the electrical cables, and
a plurality of deformable tabs, each deformable tab automatically securing an electrical cable in a different one of the plurality of openings.

22. The bracket of claim 21 wherein the plurality of openings are adapted to receive respective cables such that centerlines of the cables define a plane that is substantially parallel to, but offset from, the mounting surface.

23. The bracket of claim 21 wherein each of the plurality of openings further comprises:
a hole; and
two opposed linear sides intersecting the hole and diverging outward from the hole to form a receiving space, the receiving space permitting the deformable tabs to deform toward the hole.

24. The bracket of claim 22 wherein an intersection of the hole and the two opposed sides defines a chord across the hole having a length smaller than a maximum diameter of the electric cable.

25. The bracket of claim 22 wherein the hole has a substantially circular portion.

26. A bracket for supporting an electrical junction box within a wail frame, the junction box receiving ends of electrical cables, the bracket comprising:
a junction box support having a mounting surface with at least one hole adapted to receive a fastener connectable to the electrical junction box;
an attachment member connected to the junction box support, the attachment member adapted to be connectable to the wall frame; and
a cable support connected to the junction box support, the cable support comprising
a plurality of openings adapted to receive the electrical cables, each of the plurality of openings comprising
a hole, and a plurality of deformable tabs, each deformable tab automatically securing an electrical cable in a different one of the plurality of openings;
two opposed sides intersecting the hole and diverging outward from the hole to form a receiving space, the receiving space permitting the deformable tabs to deform toward the hole.

* * * * *

UNITED STATES PATENT AND TRADEMARK OFFICE
CERTIFICATE OF CORRECTION

| | | |
|---|---|---|
| PATENT NO. | : 6,996,943 B2 | Page 1 of 1 |
| APPLICATION NO. | : 10/108307 | |
| DATED | : February 14, 2006 | |
| INVENTOR(S) | : Dennis J. Denier, Charles H. Bull and Joseph P. Kallmeyer | |

It is certified that error appears in the above-identified patent and that said Letters Patent is hereby corrected as shown below:

Column 3, line 14 reads "...utilities, for example, electric power, is routed inside the ..." and should read -- ... utilities, for example, electric power, are routed inside the ... --.

Column 6, line 39 reads "...restrict nor in any way limit the scope of the appended..." and should read -- ... restrict or in any way limit the scope of the appended ...--.

Column 6, line 46 reads "...parts that fastened, bonded or welded together. Further..." and should read -- ... parts that are fastened, bonded or welded together. Further ...--.

Column 7, line 3 reads "...respective extender portions 762, 132. Those two 45° angles..." and should read -- ...respective extender portions 72, 132. Those two 45° angles...--.

Column 7, line 19 reads "...tracks of a wall frame. As will appreciated, in other..." and should read -- ...tracks of a wall frame. As will be appreciated, in other... --.

Column 7, CLAIM 1, line 43 reads, "...box support, the cable support extending the junction..." and should read -- ...box support, the cable support extending above the junction... --.

Column 10, CLAIM 26, line 11 read, "...within a wail frame, the junction box receiving ends of..." and should read -- ... within a wall frame, the junction box receiving ends of... --.

Signed and Sealed this

First Day of August, 2006

JON W. DUDAS
*Director of the United States Patent and Trademark Office*